United States Patent [19]
Kanesaka

[11] Patent Number: 5,123,388
[45] Date of Patent: Jun. 23, 1992

[54] OTTO-CYCLE ENGINE

[75] Inventor: Hiroshi Kanesaka, Kawasaki, Japan

[73] Assignee: Usui Kokusai Sangyo Kaisha, Ltd., Japan

[21] Appl. No.: 650,436

[22] Filed: Feb. 4, 1991

[30] Foreign Application Priority Data

Apr. 21, 1990 [JP] Japan .................................. 2-105728

[51] Int. Cl.⁵ ............................................. F02B 75/02
[52] U.S. Cl. .................................................... 123/316
[58] Field of Search ....................... 123/425, 435, 316

[56] References Cited

U.S. PATENT DOCUMENTS 3,919,986 11/1975 Goto .................................... 123/316
4,138,973 2/1979 Luria .................................... 123/316

Primary Examiner—Noah P. Kamen
Attorney, Agent, or Firm—Anthony J. Casella; Gerald E. Hespos

[57] ABSTRACT

An Otto-cycle engine in which the expansion ratio is set in the range 11:1 to 16:1. A combustion knock sensor detects the onset knocking and a valve actuating timing-adjusting device mounted on the cam shaft that drives the suction valve, delays the timing at which the suction valve is closed, via an actuator in response to the output signal from the sensor. Thus, the substantial compression ratio is adjusted.

2 Claims, 4 Drawing Sheets

OTTO-CYCLE ENGINE

BACKGROUND OF THE INVENTION

1. Field of the Invention:

The present invention relates to an Otto-cycle engine and, more particularly, to an engine that uses miller cycles as well as Otto cycles, sets the expansion ratio to a high value, and increases the compression ratio, according to the operating conditions of the engine, close to the critical level at which combustion knock occurs to increase the output power and to improve the combustion.

2. Description of the Prior Art:

Known Otto-cycle engines are designed so that the compression ratio and the expansion ratio are the same. The compression ratio is limited by combustion knock occurring in full load operation. In a non-supercharged engine, the maximum value of the compression ratio is usually about 10:1. In a supercharged engine, the compression ratio cannot be increased above about 8.5:1. Therefore, the expansion ratio assumes a value of between 8.5:1 and 10:1. High-temperature, high-pressure combustion gas produced in the cylinder does not sufficiently expand and so it is not efficiently transformed into work. The gas is then exhausted as high-temperature exhaust gas. Hence, the thermal efficiency is low.

As is well known in the art, such high-temperature exhaust gas not only reduces the thermal efficiency but increases the thermal stress in the cylinder head. This thermal loading may produce cracks in the head, and heat up the exhaust valve, to a point at which its strength is reduced. Sometimes, the exhaust valve breaks or is damaged. In a supercharged engine, decreases in the expansion ratio further elevate the exhaust has temperature. As a result, the thermal stress in the engine exceeds permissible levels. In these circumstances the exhaust gas temperature is lowered by rich air-fuel mixture. This increases fuel consumption ratio.

With turbocharging, excessive thermal stress is applied to the exhaust turbine casing and other components. This adversely affects the reliability.

In an Otto-cycle engine taking in a mixture consisting of substantially equal ratios of fuel and air, it is common practice to reduce the amount of the air-fuel mixture introduced into the engine with the throttle valve in order to alleviate the load. The negative pressure created by the throttle valve increases the power loss under partial load conditions. Furthermore, the density of the compressed air-fuel mixture is reduced, which in turn leads to incomplete combustion or a decrease in the combustion speed. As a result, the indicated thermal efficiency is reduced.

Especially when recirculation of exhaust gas and combustion of a lean air-fuel mixture are effected in order to reduce the throttling loss and to reduce NOx, poor combustion takes place so increasing the emission of HC. Therefore, a limitation may be imposed on the amount of noxious emissions. When an engine is started in cold areas, it is difficult to achieve low emissions because the compression ratio is not sufficiently high.

In the conventional Otto-cycle engine where the compression ratio and the expansion ratio are set to the same value, combustion knock imposes limitations on the maximum compression ratio as described above. Consequently, the expansion ratio is also restricted. This results in various problems including a decrease in the thermal efficiency under full load and decrease in the reliability of the engine due to excessively high exhaust gas temperature. In the case of a supercharged engine where the compression ratio is set to a lower value, the exhaust gas temperature is still higher. Rich air-fuel mixture is used to lower the temperature. This increases the fuel consumption ratio. Further, the thermal burden on the exhaust gas turbine of a turbocharger is increased, and as a result, the exhaust gas turbine and the casing must be made from expensive heat-resistant alloys.

Furthermore, when the engine is under partial load, decreases in the density of the compressed air-fuel mixture occur. If recirculation of exhaust gas and lean air-fuel mixture are utilized to reduce the throttling loss and NOx, then poor combustion results. As a result, the required amount of recirculation of the exhaust gas and sufficiently lean air-fuel mixture cannot be used. It is impossible to increase the compression ratio further to elevate the compression temperature for attaining better combustion and thus enhance the thermal efficiency.

SUMMARY OF THE INVENTION

One object of the invention is to provide an Otto-cycle engine which, when it is under full load, adjusts the compression ratio so as to adopt the greatest value permitted by the limitations imposed by combustion knock and sets the expansion ratio larger than the compression ratio to enhance the thermal efficiency and thus lower the exhaust gas temperature, and which, when the engine is under partial load, further increases the compression ratio to improve the thermal efficiency by ensuring good combustion if recirculation of the exhaust gas or a lean-fuel mixture is used.

The above object is achieved by an Otto-cycle engine comprising: an exhaust valve; a inlet valve which is closed at 60° to 140° after reaching bottom dead centre, the expansion ratio of the engine being set in the range 11:1 to 16:1 and made higher than the total compression ratio; a cam shaft driving the inlet valve; a valve actuating timing-adjusting device mounted on the cam shaft; a combustion knock sensor detecting the onset of combustion knock; and an actuator for controlling the valve actuating timing-adjusting device in response to the output signal from the sensor so as to delay closure of the inlet valve, whereby the substantial compression ratio is adjusted.

In the above-described structure, when the engine is under full load, the inlet valve would normally be closed around bottom dead centre of the induction stroke. Under these conditions, the compression ratio is set equal to the expansion ratio and too high to permit occurrence of combustion of knock.

The combustion knock sensor immediately senses combustion knock and causes the actuator to delay closure of the inlet valve. Specifically, the valve is closed during the compression stroke to shorten the duration of the compression stroke. It substantially follows that the compression ratio drops, so that combustion knock is avoided. At this time, the compression ratio drops to a value close to values assumed by normal engines. When the engine is supercharged, the density of the compressed air and temperature are increased further, so that combustion knock is more likely to occur. The knock sensor cooperates with the actuating timing-adjusting device to further delay the timing of inlet valve closure. It follows that the compression further drops, but the expansion ratio is higher than that of an ordinary engine and, therefore the thermal efficiency is improved.

When the engine is under partial load, opening of the throttle valve is narrowed to lower the substantial compression ratio, thereby to prevent knocking. The timing of inlet valve closure is advanced to increase the substantial compression ratio. The highest compression ratio is selected in response to the detection of knocking by means of the knock sensor. Good combustion immediately prior to knocking is maintained. Consequently, the indicated efficiency and the thermal efficiency are improved.

Under partial load conditions, recirculation of the exhaust gas reduces the throttling loss. Similarly, excess air is admitted by the use of a lean air-fuel mixture to reduce the throttling loss. Where the cycle is made to approximate to an air cycle to further improve the thermal efficiency and to reduce NOx, normal engines exhibit poor combustion. In accordance with the invention, the combustion knock sensor cooperates with the actuating timing-adjusting device to advance the timing of inlet valve closure close to the critical instant when knock occurs. Thus, the substantial compression ratio is increased to thereby increase the compression density and temperature. As a result, the combustion is improved.

BRIEF DESCRIPTION OF THE DRAWINGS

The invention will now be described by way of example only with reference to the accompanying drawings in which.

DETAILED DESCRIPTION OF PREFERRED EMBODIMENTS

Figure 2:
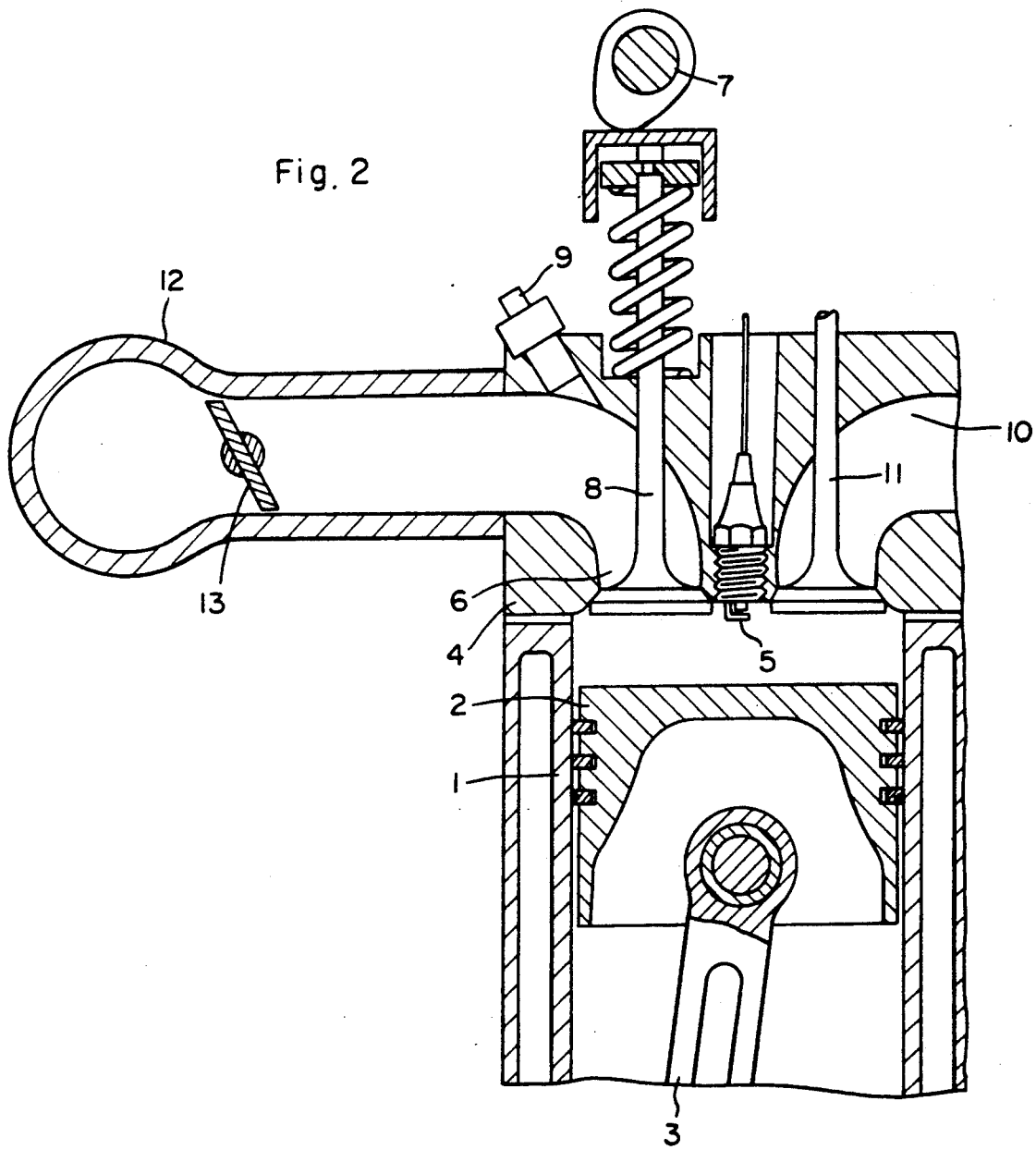
FIG. 2 is a cross-sectional view of main portions of the engine shown in FIG. 1.

The fundamental structure of an Otto-cycle engine according to the invention is shown in FIG. 2. This four-cycle engine comprises a cylinder 1, a piston 2 working in the cylinder 1, a connecting rod 3, a cylinder head 4, an ignition plug 5 within the cylinder 1, an inlet port 6, and a fuel injection valve 9. The piston 2 rotates a crank shaft (not shown) via the connecting rod 3. A inlet cam 7 and an inlet valve 8 opened and closed by the cam 7 are installed in the inlet port 6. An exhaust valve 11 is mounted in the exhaust port 10. The ignition plug 5 performs ignition operations in synchronism with the crank shaft of the engine. The inlet valve 8 and the exhaust valve 11 are opened and closed by a known valve-actuating mechanism also in synchronism with the crank shaft. The exhaust valve 11 is opened and closed at conventionally adopted timing. The inlet valve 8 is opened and closed at timing that is varied by a valve actuating timing-adjusting device (described later) according to the operating conditions of the engine.

Figure 1:
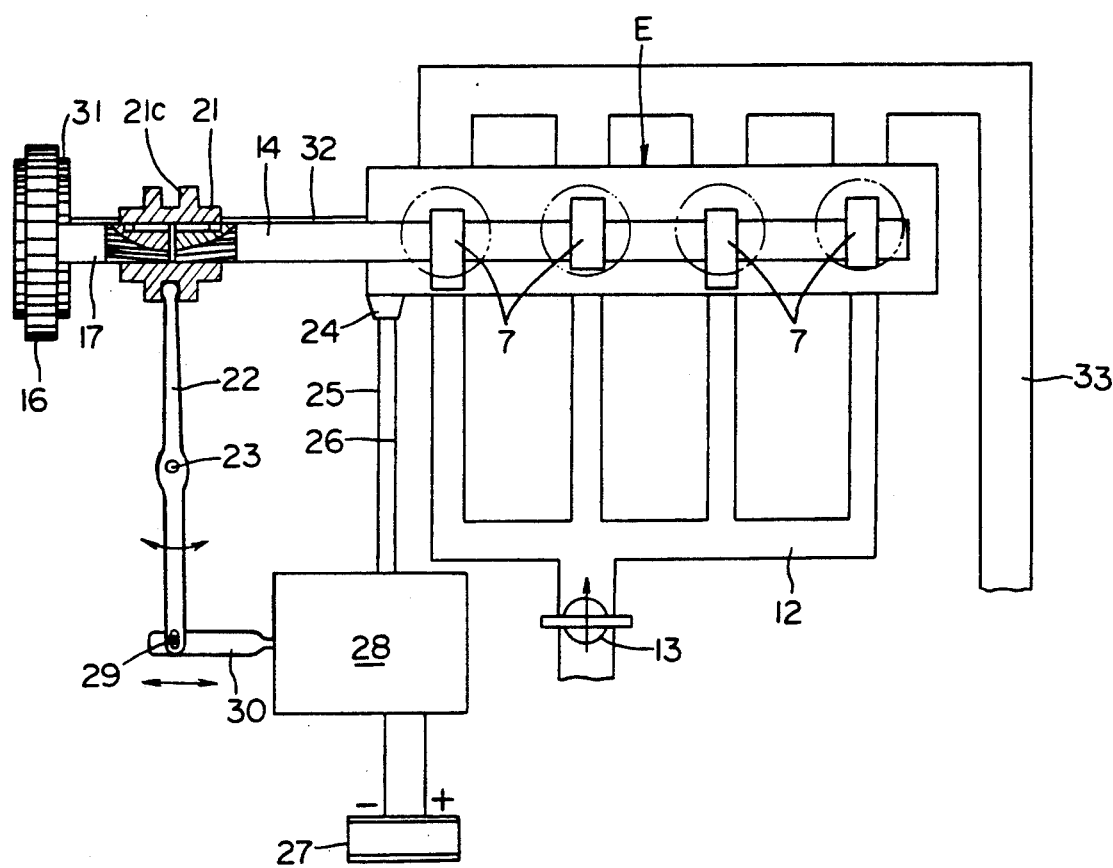
FIG. 1 is a schematic diagram of an Otto-cycle engine according to the invention.

As shown in FIG. 1, an inlet manifold 12 is in communication with the inlet port 6 to form an inlet passage in which a throttle valve 13 is mounted.

Figure 3:
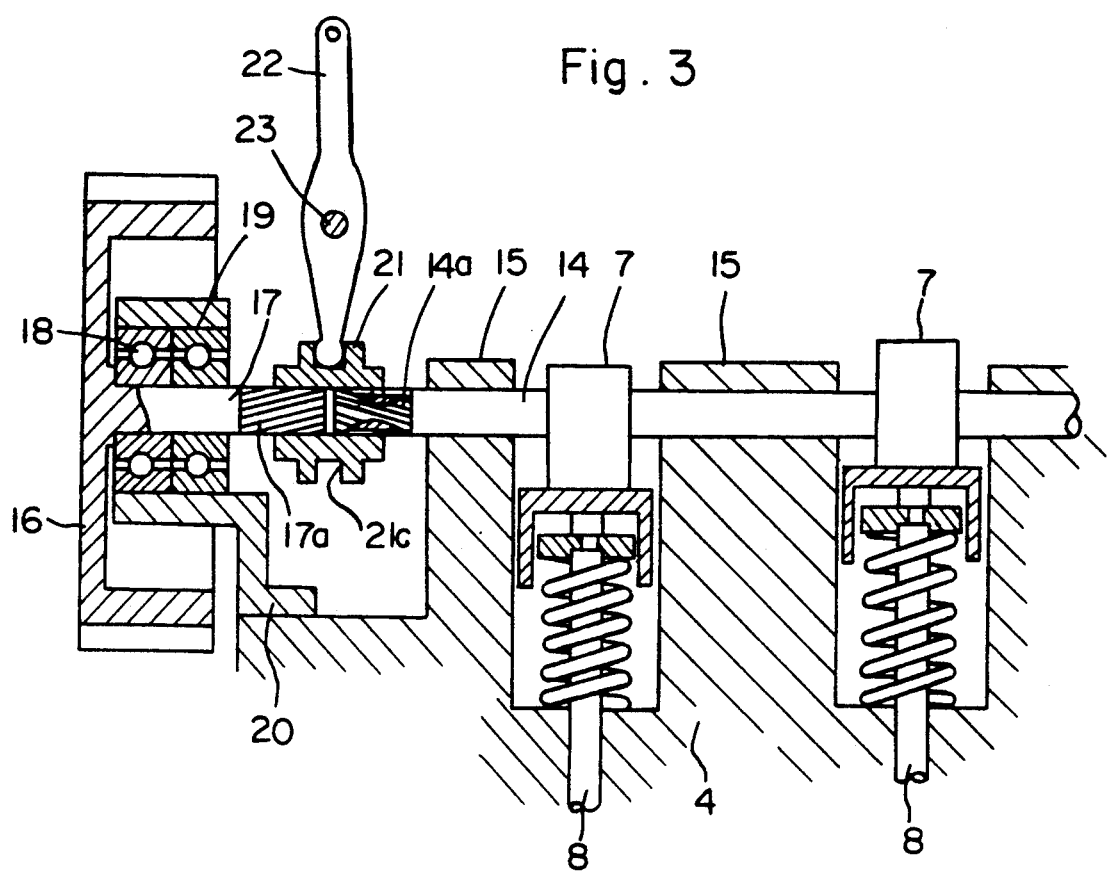
FIGS. 3 and 4 are cross-sectional views of the valve actuating timing-adjusting device shown in FIG. 1 (FIG. 4 being enlarged)
Figure 4:
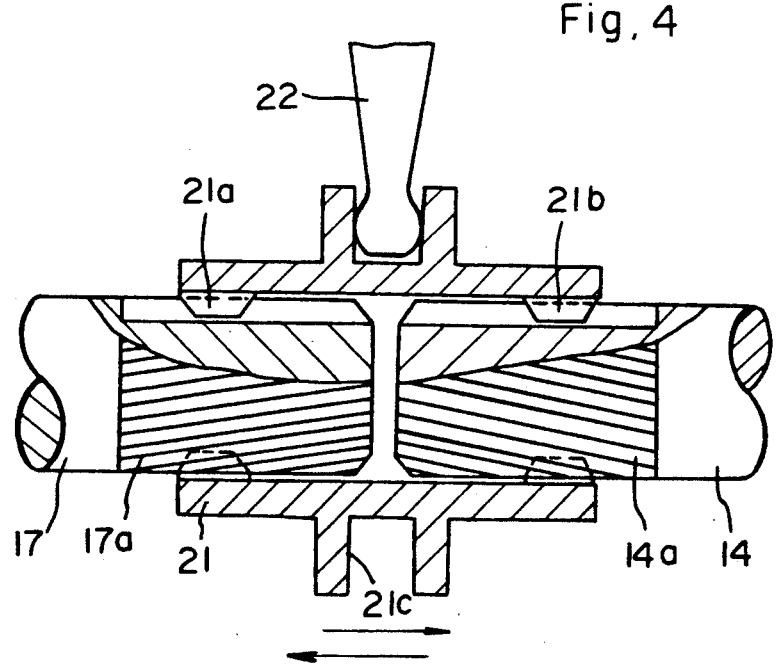

Referring to FIGS. 3 and 4, there is shown a valve actuating timing-adjusting device including a mechanism for actuating the inlet valve 8. This valve 8 is opened and closed by the cam 7 formed on a part of a cam shaft 14 that is held by a bearing 15. A left-handed helical spline 14a is formed at one end of the shaft 14. A timing gear 16 is connected with the crank shaft (not shown) via gearing. A rotating shaft 17 integral with the gear 16 is supported via bearings 18, 19 to a bracket 20 mounted to the engine. A right-handed helical spline 17a is formed at an end of the shaft 17 and connected with the left-handed helical spline 14a by an adjusting member 21. Protrusions 21a and 21b engaging the splines are formed on the inner surface of the member 21.

An adjusting lever 22 is held by a shaft 23. One end of the lever 22 is fitted in a recess 31c formed in the adjusting member 21. In the present example shown in FIGS. 3 and 4, the cam shaft 14 can be angularly moved in a desired direction relative to the rotating shaft 17 by shifting the adjusting member 21 to the left. The shaft 14 can be angularly moved in the opposite direction by shifting the member 21 to the right. In this way, the timing at which the cam shaft 14 is rotated is changed by axial movement of the adjusting member 21. As a result, the timing of inlet valve 8 opening and closure is adjusted.

FIG. 1 shows a four-cycle Otto-cycle engine according to the invention, the engine being equipped with the valve actuating timing-adjusting device described above. A combustion knock sensor 24 is mounted on the outer wall of the engine, indicated by E. The sensor 24 produces a signal in response to vibration of the engine caused by combustion knock. The signal is supplied via lead wires 25 and 26 to an actuator 28 which is energized by a power supply 27.

When the actuator 28 receives the signal indicating knock, it pushes a rod 30 to the left, a pin 29 being mounted to the rod 30. Then, the lever 22 is rotated in a clockwise direction about the shaft 23 to push the adjusting member 21 to the right. The instant at which the inlet valve 8 opens is delayed as described above. In consequence, the effective compression ratio of the engine is lowered. Also shown in FIG. 1 are a crank gear 31 fixedly mounted to the front end 32 of the crank shaft and an exhaust pipe 33. The crank gear 31 acts to drive the timing gear 16. Since the charger is of the conventional construction, it is not shown.

In operation of this four-cycle Otto-cycle engine, the expansion ratio is set to, for example, 11:1 to 16:1, i.e much larger than the ratio (10:1) set in normal Otto-cycle engines. Under full load condition, the inlet valve 8 closes near 50° after bottom dead centre in the induction stroke in the same way as in an ordinary engine by the actuator 28. At this time, the compression ratio is substantially equal to the expansion ratio. In this state, if the engine is started, combustion knocking is likely to occur, because the compression ratio is too high. However, such knocking is immediately detected by the knocking sensor 24 which transmits an output signal to the actuator 28, which then moves the rod 30 to delay the timing of inlet valve 8 closure mention previously. Hence, the valve 8 is closed before the induction stroke ends.

In the above example, the knocking sensor 24 cooperates with the valve actuating timing-adjusting device. Knocking may however, be forecast from the operating conditions of the engine by detecting the engine water temperature, the engine speed, the position of the accelerator pedal, and the composition of the air-fuel mixture taken into the engine. In a modified embodiment, the valve actuating timing-adjusting device may be operated according such a forecast so as to vary the timing of inlet valve 8 closure.

Figure 5:
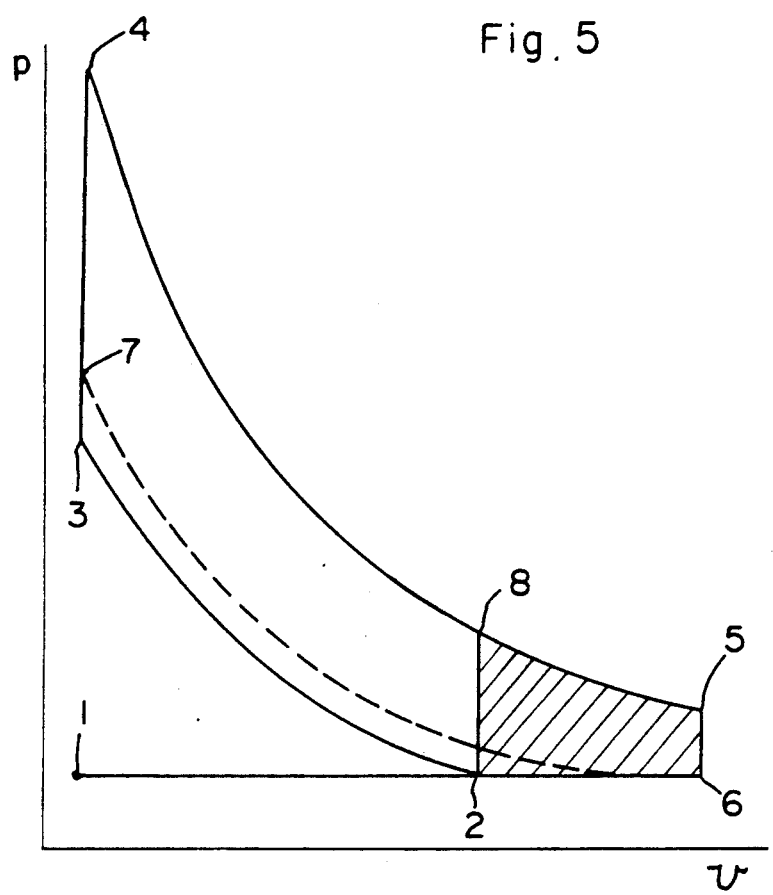
FIGS. 5 and 6 are graphs showing the performance of the engine shown in FIG. 1.

Referring now to the p-v diagram of FIG. 5. Induction of air begins at point 1, or the top dead centre of an induction stroke and ends at point 6, or at bottom dead centre. A compression stroke commences at point 7. If compression is continued as it is, the operation will proceed as indicated by the broken line. At top dead centre (compression), the air-fuel mixture is adiabatically compressed. The compression pressure is indicated by point 7. Excess pressure and concomitant high temperature will produce knocking which is immediately detected by the knocking sensor 24. The actuator 28 delays inlet valve 8 closure, in response to the output signal from the sensor 24. In this manner, after knocking is detected, the inlet valve 8 is maintained open even after the induction stroke. Air once admitted from the inlet valve 8 that is open even during compression stroke is forced back into the inlet passage consisting of the inlet port 6 and the inlet manifold 12 from the cylinder 1. The inlet valve 8 closes at point 2 during the compression stroke at about 90° after bottom dead centre. Therefore, the effective compression stroke begins at point 2 and ends at point 3, or top dead centre (of compression). The compression pressure indicated by point 3 is lower than at points 4 and 7. Simultaneously, the compression temperature drops. Subsequently, knocking is avoided.

In a conventional engine where the compression ratio is set to 10:1 to narrowly avoid knocking, the expansion ratio is also set to 10:1 as described above. The indicated amount of work produced inside the cylinder is given by the area of the portion surrounded by lines 2-3-4-8-2 in FIG. 5. In the novel engine, the expansion stroke is given by line 4-5 which is longer than line 4-8 indicating the expansion stroke of a conventional engine. Therefore, the expansion ratio is higher. The indicated amount of work is given by the area of the portion surrounded by lines 2-3-4-5-6-2 in FIG. 5. Eventually, the area corresponding to the novel engine is greater than the area corresponding to the conventional engine by the area of the hatched portion surrounded by lines 2-8-5-6-2. That is, the indicated amount of work done by the novel engine is larger than that of the conventional engine. Although the amount of air-fuel mixture supplied between points 1 and 2, i.e the amount of fuel consumed, is not changed, the output is increased. Consequently, the thermal efficiency is enhanced.

As described above, the amount of work is larger for the same fuel consumption. In other words, if expansion is extended from point 8 to point 5, then the exhaust gas temperature will drop, thus reducing the thermal loads on various components of the engine.

Where the engine is supercharged, knocking occurs because of high induction pressure. In this case, the knocking sensor 24 cooperates with the valve actuating timing-adjusting device to further delay the timing of inlet valve 8 closure, in order to further reduce the substantial compression ratio. Point 2 in FIG. 5 is shifted further to the left. At this time, the effective compression ratio drops further, but the large expansion ratio is not changed. Consequently, it is unlikely that the thermal efficiency deteriorates or the exhaust gas temperature is elevated.

Where the atmospheric conditions or the operating conditions of the engine permit the compression ratio to be increased, e.g when the temperature of the wall of the combustion chamber is low as when the engine is operating under light load, the amount of air taken into the novel engine E and the output power can be increased by delaying the timing of inlet valve 8 closure so as to increase the compression ratio. As a result, point 2 in FIG. 5 is shifted to the right. This means that the automobile can accelerate from rest at a rate which temporarily exceeds the acceleration produced when the automobile operates under high continuous load conditions. In this manner, the accelerating ability of the automobile can be increased.

Figure 6:
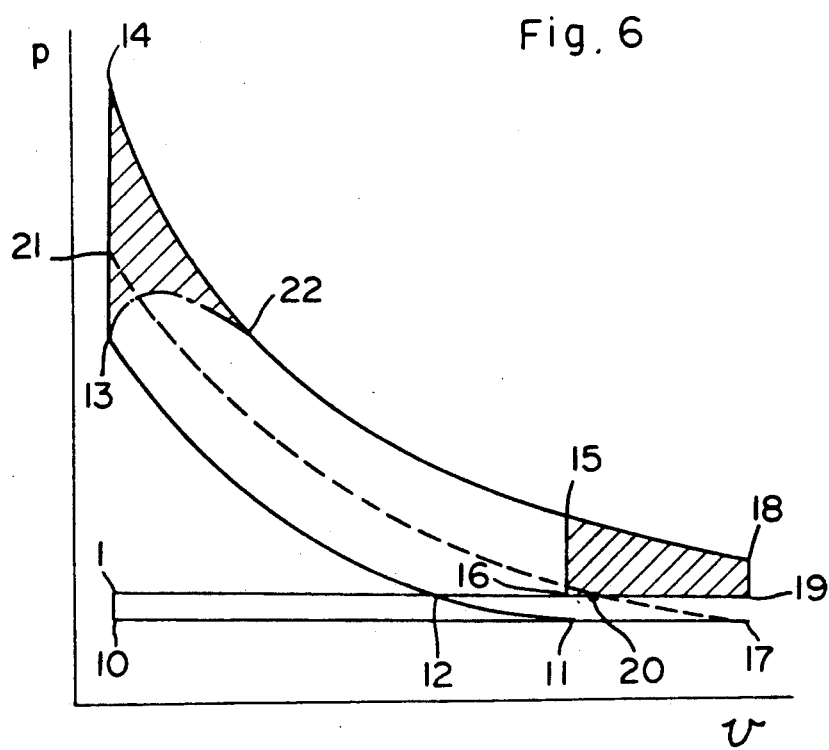

Operation of the engine under partial load is now described by referring to the p-v diagram of FIG. 6 in which, for clarity, negative pressure is exaggerated by a factor of five compared with positive pressure. In the conventional engine, flow of inspirated air is reduced by the throttle valve. During the induction stroke, the cylinder pressure drops to point 10. The induction stroke ends at point 11. At this time, the temperature of inspirated air drops because of adiabatic expansion occurring from point 1 to point 10. Air flow is accelerated by the amount of work given by the area surrounded by lines 1-10-11-12-1, or by the difference between the pressure at point 1 and the pressure at point 10. At this time, movement of the air is transformed into heat, and the temperature of the air is restored to atmospheric temperature. The temperature at point 11 approaches atmospheric temperature. During the compression stroke beginning at point 11, the pressure reaches atmospheric pressure at point 12. Line 1-12 indicates the amount of inspirated air-fuel mixture expressed in terms of atmospheric pressure. At point 13, or top dead centre of the compression stroke, the compression ratio and the compression temperature become equal to those obtained under full load, but the density and the combustion speed are lower than under full load. The p-v diagram is given by line 13-22 indicated by the dot-and-dash line in FIG. 6. An amount of work given by the hatched area surrounded by lines 13-14-22-13 is lost. At this time. the indicated amount of work is given by the area surrounded by lines 12-13-22-15-16-12. Hence, in these circumstances the thermal efficiency is low.

Especially where recirculation of exhaust gas or a lean air-fuel mixture is used to prevent air pollution or to improve the thermal efficiency, poor combustion tends to occur. As described above, the indicated thermal efficiency deteriorates. The result is that improvement in the thermal efficiency of the Otto-cycle engine under partial load is hindered.

In the induction stroke of the novel engine, the inlet pressure is lowered to point 10 by the throttle valve 13. The induction stroke ends at point 17 and then a compression stroke begins. However, the inlet valve 8 remains open until closure at point 11 during the compression stroke. It follows that the effective compression stroke begins at point 11. At point 13, the compression pressure and temperature become equal to those obtained with an ordinary engine. Since the expansion ratio is set higher in the novel engine, the indicated amount of work is greater than the indicated amount of work done by the conventional engine by an amount indicated by the area surrounded by lines 16-15-18-19-16 as described above. Consequently, the thermal efficiency can be improved.

Where the exhaust gas is recirculated by the amount indicated by line 1-12 or a lean air-fuel mixture is burned by inhaling excess air together with air-fuel mixture of the above described theoretical mixture ratio indicated by line 1-12, poor combustion often takes place. In the novel engine, the inlet valve 8 is closed at bottom dead centre or point 17 in FIG. 6, to start the compression stroke at point 17. The air-fuel mixture is compressed up to point 21, for example, at a compression ratio of 16:1. In this way, both pressure and temperature are increased to thereby achieve good combustion.

At this time, if knocking is induced by an excessive compression ratio, then the knocking sensor 24 cooperates with the actuator 28 to delay the timing of inlet valve 8 closure to lower the effective compression ratio, for avoiding knocking as described above. Also, knocking can be avoided by increasing the amount of recirculated exhaust gas or the amount of air so that the air-fuel mixture may not readily induce knocking. Good combustion and a large expansion ratio can produce a high indicated thermal efficiency even under partial load condition producing throttling losses.

Also when starting the engine, the novel engine can increase the compression ratio up to the expansion ratio by advancing the timing of inlet valve 8 closure. This increases both compression pressure and temperature. Hence, the engine can be started more easily at low temperatures.

As described thus far, in accordance with the present invention, the expansion ratio of the engine is set higher than the compression ratio set under full load. Knocking is detected by a knocking sensor at the onset of knocking. The timing of inlet valve closure is delayed by a valve actuating timing-adjusting device in response to the output signal from the knocking sensor, so that the effective compression ratio is adjusted. Hence, the compression ratio of the engine is maintained close to the critical value at which knocking occurs, whether the engine is supercharged, the engine is not supercharged under load, or under partial load condition using recirculation of exhaust gas or a lean air-fuel mixture. Consequently, the thermal efficiency can be improved greatly by good combustion and a high combustion ratio.

If the expansion ratio of the novel engine is set substantially equal to the expansion of Diesel engines, the novel Otto-cycle engine shows a higher indicated efficiency than the Diesel engines. The Otto-cycle engine in which combustion pressure is low suffers from less friction loss. Furthermore, the piston and the connecting rod which are light in weight reduce the friction loss further. The fuel consumption of the Otto-cycle engine can be made lower than that of Diesel engines.

Diesel engines emit larger amounts of NOx, HC, CO, and other substances than the Otto-cycle engine using catalytic converter rhodium. At present, there is no practical technique for removing particulates. On the other hand, the novel engine is superior in thermal efficiency to Diesel engines. Further, the novel engine can meet current emission control regulations.

I claim:

1. An Otto-cycle engine including an exhaust valve;
an inlet valve adapted to be closed at 60° to 140° after bottom dead centre, the expansion ratio of the engine being in the range 11:1 to 16:1 and in use greater than the total compression ratio;
a cam shaft for driving the inlet valve;
a valve actuating timing-adjusting device mounted on the cam shaft;
a combustion knock sensor for detecting knocking in use at the commencement thereof; and
an actuator for controlling the valve actuating timing-adjusting device in response to the output signal from the sensor so as to delay the timing at which the inlet valve is closed in use whereby the effective compression ratio is altered.

2. An Otto-cycle engine comprising:
an exhaust valve;
an inlet valve adapted to be closed at 60° to 140° after bottom dead centre, the expansion ratio of the engine being in the range 11:1 to 16:1 and greater than the total compression ratio;
a cam shaft for driving the inlet valve;
a valve actuating timing-adjusting device amounted on the cam shaft;
a combustion knock forecasting means for forecasting knocking by monitoring the operating conditions of the engine in use; and
an actuator for controlling the valve actuating timing-adjusting device in response to the output signal from the forecasting means so as to delay the timing at which the inlet valve is closed, whereby the effective compression ratio is altered.

* * * * *